US006712888B2

(12) United States Patent
Siska

(10) Patent No.: US 6,712,888 B2
(45) Date of Patent: Mar. 30, 2004

(54) ENGINE EMISSION CONTROL SYSTEM AND METHOD

(76) Inventor: Albert F. Siska, P.O. Box 833, Pelham, NH (US) 03076

( * ) Notice: Subject to any disclaimer, the term of this patent is extended or adjusted under 35 U.S.C. 154(b) by 0 days.

(21) Appl. No.: 10/178,654

(22) Filed: Jun. 24, 2002

(65) Prior Publication Data

US 2003/0233943 A1 Dec. 25, 2003

(51) Int. Cl.$^7$ .............................................. B01D 35/147
(52) U.S. Cl. ...................... 96/417; 55/312; 55/DIG. 30; 96/421; 95/1; 95/19
(58) Field of Search ................... 55/312, 314, DIG. 30; 96/417, 421; 95/1, 19; 60/311

(56) References Cited

U.S. PATENT DOCUMENTS

| 2,488,563 | A |   | 11/1949 | Sills .............................. 60/29 |
| 3,680,318 | A |   | 8/1972 | Nakajima et al. ............. 60/278 |
| 3,705,497 | A |   | 12/1972 | Hollins ......................... 60/283 |
| 3,757,521 | A |   | 9/1973 | Tourtellotte et al. .......... 60/274 |
| 3,805,521 | A |   | 4/1974 | Dafler et al. .................. 60/288 |
| 3,837,165 | A |   | 9/1974 | Arrigoni et al. .............. 60/277 |
| 3,938,409 | A |   | 2/1976 | Uozumi ........................ 74/866 |
| 3,972,184 | A |   | 8/1976 | Warren ......................... 60/288 |
| 4,803,838 | A |   | 2/1989 | Kaeser ......................... 60/288 |
| 5,067,973 | A | * | 11/1991 | Pattas ............................ 95/12 |
| 5,794,920 | A | * | 8/1998 | Kronberger ................. 254/361 |

OTHER PUBLICATIONS

AirCor Corporation, Smoke Blotter Diesel Exhaust Filter System.

* cited by examiner

Primary Examiner—Robert A. Hopkins
(74) Attorney, Agent, or Firm—R. Anthony Diehl

(57) ABSTRACT

An exhaust filtration control system for creating environmentally protected zones. The system includes, a diverter valve, a valve actuator coupled to the diverter valve, a control switch electronically coupled to the valve actuator for switching the valve actuator between an engaged state and a disengaged state, a wireless transmitter, and a wireless receiver coupled to the control switch for receiving a signal from the wireless transmitter and for sending a signal to the control switch upon receiving a signal from the wireless transmitter.

20 Claims, 2 Drawing Sheets

ENGINE EMISSION CONTROL SYSTEM AND METHOD

FIELD OF THE INVENTION

The present invention relates to methods and devices for controlling the flow of exhaust gasses from internal combustion engines.

BACKGROUND OF THE INVENTION

Exhaust gasses from internal combustion engines present many well known environmental and health hazards. The exhaust, gasses from diesel engines are particularly noxious and difficult to abate. Essentially, two basic abatement methods are employed.

The most common method is employed in garages and the like to redirect the diesel exhaust from the inside to the outside of a building using manually connected hoses and/or exhaust fans. Such methods, however, are neither mobile, nor do they necessarily abate the air pollution since the exhaust is merely redirected to another location.

Another common diesel exhaust abatement method is to employ an exhaust filter, typically between the manifold and the muffler of the device. Unfortunately, due to the nature of diesel engines, known filtration media tend to become saturated in a relatively short period of time. Moreover, saturated filtration media leads to increased backpressure, which can decrease engine performance and lead to engine damage.

As a result, many known filtration systems and methods for diesel engines are intended to be used only when there is an acute need to reduce noxious exhaust elements. In particular, most known systems are designed to be engaged only when a vehicle is in a garage. Typically, engagement and disengagement of the filtration equipment is accomplished manually by the operator of the equipment or is tied to certain equipment events, such as, certain engine conditions (temperature, back-pressure, etc.), engine operating time, engine start-up or entering reverse gear, thought to correlate to the appropriate filtration times. Unfortunately, the correlation between such events and conditions are very inexact and result in many circumstances where filtration equipment is disengaged when it would be desirable for it to be engaged, and vice versa. Further, the provision of a manual override is an inadequate solution because it requires operator attention to a task that may have relatively low priority to the operator.

Accordingly, there is a need for engine emission control systems that reliably engage and disengage automatically in order to create a protected zone environment at certain selected locations.

SUMMARY OF THE INVENTION

The present invention is directed to an exhaust filtration control system comprising a diverter valve, a valve actuator coupled to the diverter valve, a control switch electronically coupled to the valve actuator for switching the valve actuator between an engaged state and a disengaged state, a wireless transmitter, and a wireless receiver coupled to the control switch for receiving a signal from the wireless transmitter and for sending a signal to the control switch upon receiving a signal from the wireless transmitter.

The present invention is also directed to an exhaust filtration system retrofit kit for a diesel engine powered device, comprising a valve comprising first and second opposed openings, said first opening adapted to be coupled to an exhaust conduit of said device and said second opening adapted to be coupled to an exhaust conduit of said device, said valve further comprising a third opening adapted to be coupled to a filtration system conduit, a valve actuator coupled to the valve for moving the valve between an open state and a closed state, a control switch electronically coupled to the valve actuator for switching the valve actuator between an engaged state and a disengaged state, a wireless receiver coupled to the control switch for receiving a radio frequency signal from a wireless transmitter and for sending a signal to the control switch, and a wireless transmitter for generating a radio frequency signal.

The present invention is also directed to a method for controlling an exhaust filtration system on a device having a diesel engine, a diesel exhaust filter, a valve that directs exhaust to the filter in an engaged state and that directs exhaust away from the filter in a disengaged state, and a valve actuator that moves the valve between the engaged and disengaged states, comprising the steps of placing a radio frequency transmitter in a location where it is desired to have the filter in an engaged state if the device is present at the location and providing a radio frequency receiver coupled to the valve actuator. The receiver causes a signal to be sent to the valve actuator if the receiver receives a radio frequency signal from the transmitter and said signal causes said actuator to move the filter to the engaged state.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
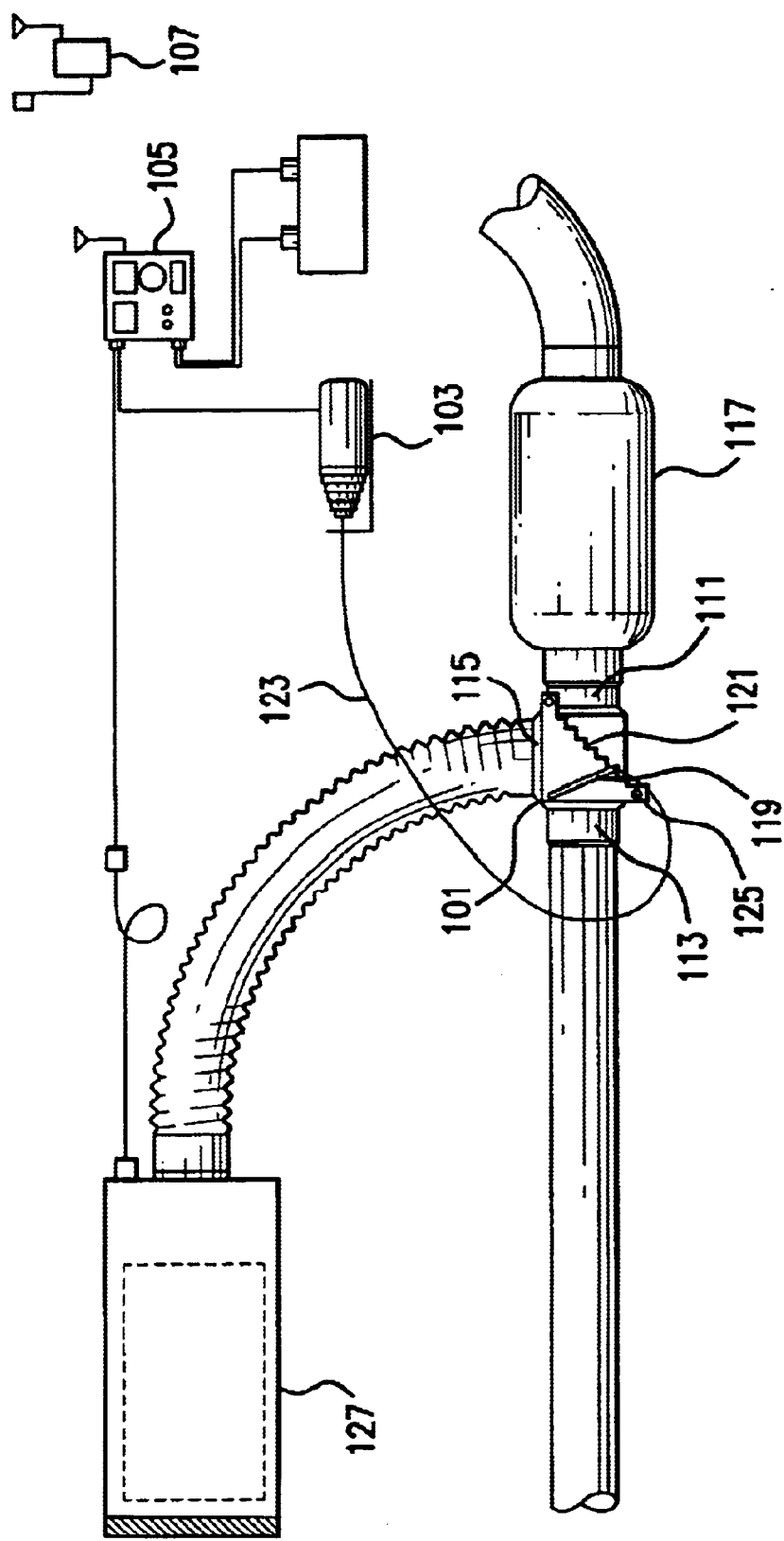
FIG. 1 is schematic view of a filtration system in accordance with the present invention.

Referring now to FIG. 1, an exhaust filtration control system in accordance with the present invention comprises a diverter valve 101, a valve actuator 103 coupled to the diverter valve, a control switch 105 electronically coupled to the valve actuator for switching the valve actuator between an engaged state and a disengaged state, and a wireless transmitter 107. Further, the control switch is coupled to a wireless receiver 109 for receiving a signal from the wireless transmitter.

A diverter valve 101 suitable for use with the present invention is any 2-position diverter valve adapted to be connected to a conduit of an exhaust system. Any such valve will have an exhaust gas entrance port 111 and 2 exhaust gas exit ports 113 and 115. Preferably, the diverter valve is all welded construction. The entrance port 111 is adapted to be coupled to the exhaust conduit of a muffler and/or spark arrestor 117 or other exhaust system element. The first exit port 115 is adapted to be coupled, directly or indirectly to the exhaust gas filtration system. The second exit port 113 is adapted to be coupled to another downstream element of the exhaust system other than the filtration system. Accordingly, when the valve flapper 119 is in a first (open) position, exhaust gas is directed to the filter 127. When the valve flapper 119 is in its second (closed) position, exhaust gas is directed away from the filter, generally to the atmosphere. Preferably, the flapper 119 is biased into the closed position by a spring or other resilient member 121.

A valve actuator 103 suitable for use with the present invention is any valve actuator sufficient to move the valve flapper between the open and closed positions while the engine is operating, such as a solenoid or a pneumatic, or hydraulic cylinder. Preferably, the actuator is a solenoid that is sufficiently powerful to overcome the pressure of the exhaust stream and the return spring and yet has a low enough return pressure to be returned to the disengaged state by action of the return spring. Preferably, the valve actuator is an electromagnetic dual coil hi/lo amperage solenoid, 12 volt DC. A suitable solenoid for most vehicle applications is Trombetta Model P-516 solenoid. Pneumatic or hydraulic valve actuators may also be used in accordance with the present invention. In a preferred embodiment, the solenoid is coupled to a flexible cable 123 or other linkage, which is coupled to a lever handle 125 attached to the flapper 119. Accordingly, when the solenoid 103 is de-energized, the biasing means 121 coupled to the flapper 119 retains the valve in the closed position. When the solenoid 103 is energized the flexible cable 123 moves the flapper 119 so that the valve is in the open position. Preferably, the valve actuator is mounted remotely from the valve to protect the valve actuator from the heat that is typically present in the exhaust stream.

Figure 2:
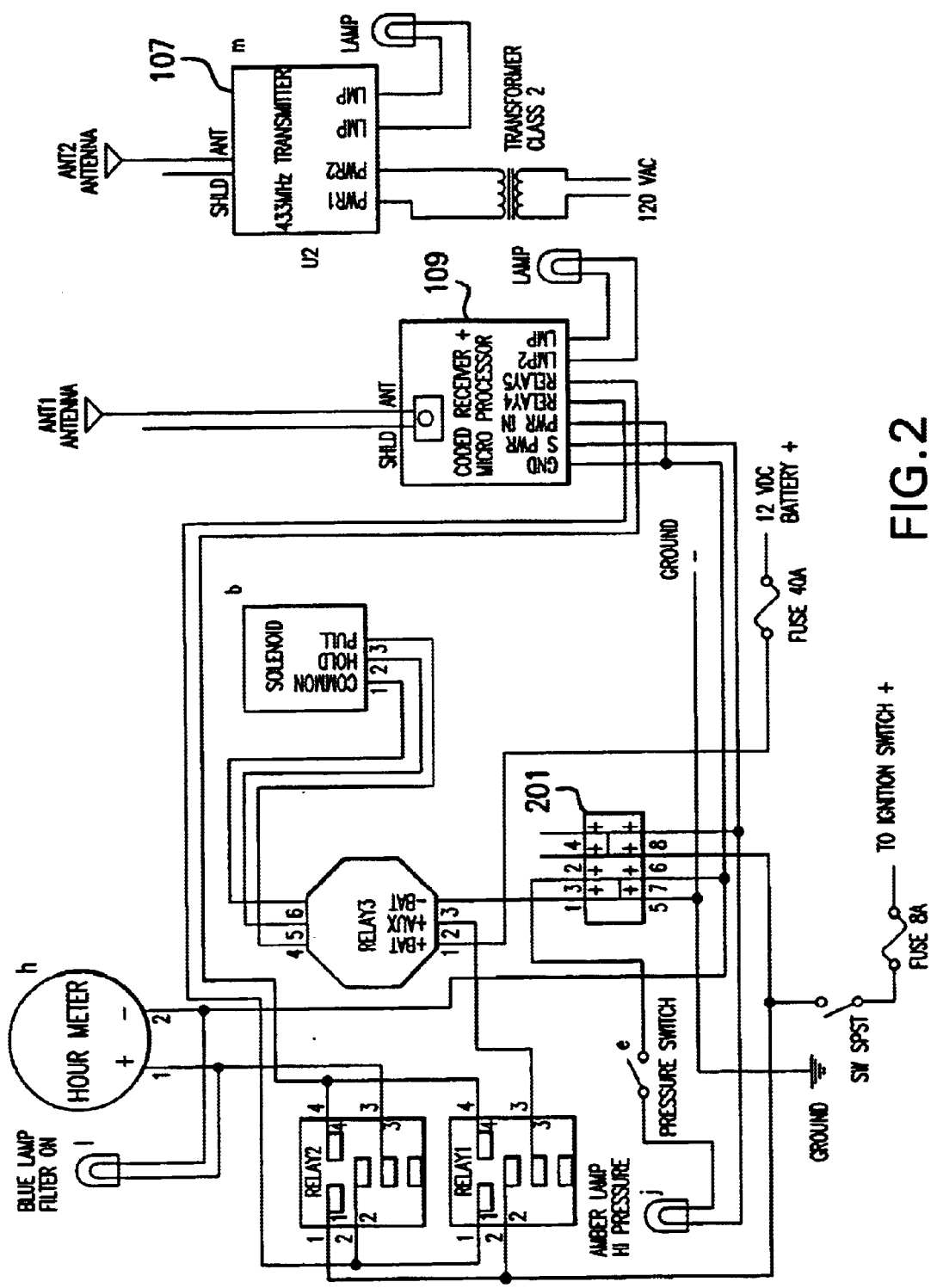
FIG. 2 is a schematic diagram of a control system for a filtration system in accordance with the present invention.

Referring now to FIG. 2 there is shown a schematic diagram of a control system for a filtration system in accordance with the present invention. The control system comprises a switch 201 for actuating the solenoid 103, a radio frequency ("rf") receiver 109 coupled to the switch and at least one rf transmitter 107.

Suitable rf transmitters are fixed low frequency transmitters. Preferably, the transmitters are variable code lock having adjustable tuned sensitivity ranges. A preferred transmitter is a 12 volt with 120 volt A.C. adapter/transformer or other locally compatible power supply. A system in accordance with the present invention may include multiple rf transmitters positioned at various locations.

The rf receiver is coupled to the switch such that when the rf receiver receives a signal from the rf transmitter, the solenoid is energized, thereby causing the valve to pull open and stay open, thereby directing exhaust gas to the filtration system. Suitable rf receivers are any receiver capable of receiving a signal from the transmitter. Preferably, the receiver is a variable code lock receiver with a tuning capacitor 12 volt negative ground or other compatible power supply. The receiver preferably incorporates a time delay that causes the receiver to delay for a specified period sending a signal to the control switch indicating that it is no longer receiving the rf signal from the transmitter. If the receiver reacquires a signal from the transmitter during the preset delay period, then no signal is sent to the control switch unless and until the receiver again loses the signal from the transmitter for the full delay period. The delay period is selected to provide sufficient time for the engine or vehicle to leave the vicinity of the transmitter and thereby avoid unintended reactivation of the system, and is preferably about 10 to 30 seconds.

Preferably, the receiver and transmitter are selected such that the maximum range that receiver receives a signal from the transmitter is about 50 to about 250 feet. This range may be tuned by adjusting the position and/or length of the receiver and/or transmitter antennae, and or by other means known in the art. It should be noted that the wireless receiver and transmitter may be infra-red, microwave, or any other suitable wireless transmitter and receiver combination.

The control system may further comprise additional control elements coupled to the switch, such as, a cumulative hour meter, a back-pressure sensor that illuminates a warning light and/or de-energizes the solenoid if excessive back-pressure is detected thereby preventing operation of the filtration system if the system is too clogged to operate properly. The control circuit may further comprise a timer and/or a manual switch for overriding or modifying control of the solenoid by the rf receiver.

The present invention is also directed to a method for controlling an exhaust filtration system on a device having a diesel engine, a diesel exhaust filter, a valve that directs exhaust to the filter in an engaged state and that-directs exhaust away from the filter in a disengaged state, and a valve actuator that moves the valve between the engaged and disengaged states. The method comprises the steps of placing a radio frequency transmitter in a location where it is desired to have the filter in an engaged state if the device is present at the location, and providing a radio frequency receiver coupled to the valve actuator, wherein the receiver causes a signal to be sent to the valve actuator if the receiver receives a radio frequency signal from the transmitter and said signal causes said actuator to move the filter to the engaged state.

For example, it is contemplated that systems in accordance with the present invention could be installed on multiple vehicles housed in a single garage., In such a case, a single transmitter located at the garage could cause the filtration system to be engaged on all such vehicles when they are in the vicinity of the garage (in the range of the transmitter). In addition, additional transmitters could be installed at additional locations, such as work sites, barns, school yards, hospitals, warehouses, tunnels, bus stops and the like thereby causing the filtration systems on the vehicles to be engaged when in the vicinity of said additional locations (environmentally protected zones).

Modifications and substitutions by one of ordinary skill in the art are considered to be within the scope of the present invention, which is not to be limited except by the following claims.

What is claimed is:

1. An exhaust filtration control system comprising:
   a diverter valve for a combustion engine exhaust value;
   a valve actuator coupled to the diverter valve;
   a control switch electronically coupled to the valve actuator for switching the valve actuator between an engaged state and a disengaged state;
   a wireless transmitter;
   a wireless receiver coupled to the control switch for receiving a signal from the wireless transmitter and for sending a signal to the control switch upon receiving a signal from the wireless transmitter.

2. The system of claim 1, wherein the valve actuator is located remotely from the diverter valve.

3. The system of claim 1, wherein the valve actuator is a solenoid.

4. The system of claim 1, wherein the valve actuator is a pneumatic or hydraulic cylinder.

5. The system of claim 1, wherein the receiver-transmitter range is from about 50 to about 250 feet.

6. The system of claim 1, wherein the receiver-transmitter range is adjustable.

7. The system of claim 1, wherein the valve is positioned downstream of a muffler or spark arrestor.

8. The system of claim 1, wherein the receiver comprises a means for delaying, sending a signal to the control switch after receiving a signal from the wireless transmitter.

9. An exhaust filtration system kit for a diesel engine powered device, comprising:

a valve comprising first and second opposed openings, said first opening adapted to be coupled to an exhaust conduit of said device and said second opening adapted to be coupled to an exhaust conduit of said device, said valve further comprising a third opening adapted to be coupled to a filtration system conduit;

a valve actuator coupled to the valve for moving the valve between an open state and a closed state;

a control switch electronically coupled to the valve actuator for switching the valve actuator between an engaged state and a disengaged state;

a wireless receiver coupled to the control switch for receiving a radio frequency signal from a wireless transmitter and for sending a signal to the control switch; and a wireless transmitter for generating a radio frequency signal.

10. The system of claim 9, further comprising a cable to connect the valve actuator to the diverter valve.

11. The system of claim 9, wherein the valve actuator is a solenoid.

12. The system of claim 9, wherein the valve actuator is a pneumatic or hydraulic cylinder.

13. The system of claim 9, wherein the receiver-transmitter range is from about 50 to about 250 feet.

14. The system of claim 9, wherein the receiver-transmitter range is adjustable.

15. The system of claim 9, wherein the valve is adapted to be positioned downstream of a muffler or spark arrestor.

16. The system of claim 9, wherein the receiver comprises a means for delaying sending a signal to the control switch after receiving a signal from the wireless transmitter.

17. A method for controlling an exhaust filtration system on a device having a diesel engine, a diesel exhaust filter, a valve that directs exhaust to the filter in an engaged state and that directs exhaust away from the filter in a disengaged state, and a valve actuator that moves the valve between the engaged and disengaged states, comprising the steps of:

placing a radio frequency transmitter in a location where it is desired to have the filter in an engaged state if the device is present at the location; and providing a radio frequency receiver coupled to the valve actuator, wherein the receiver causes a signal to be sent to the valve actuator if the receiver receives a radio frequency signal from the transmitter and said signal causes said actuator to move the valve to the engaged state.

18. The method of claim 17, further comprising the step of providing at least one additional radio frequency transmitter at at least one additional location.

19. The method of claim 17, wherein the receiver causes a signal to be sent continuously to the valve actuator as long as the receiver is receiving a signal form the transmitter and wherein when the receiver ceases to receive a signal from the transmitter, the receiver ceases to cause a signal to be sent to the valve actuator, thereby causing the valve actuator to move the valve to a disengaged state.

20. The method of claim 17, wherein the receiver delays for a pre-determined period sending a signal to the valve actuator after the receiver receives a radio frequency signal from the transmitter.

* * * * *